Feb. 18, 1930.                                    1,747,536
R. AERNOUT, BARON VAN LYNDEN
FLUID CURRENT METER
Filed Jan. 21, 1927          3 Sheets-Sheet 1

INVENTOR
Robert Aernout,
Baron Van Lynden,
BY
Watson, Coit, Moree & Grindle
ATTYS

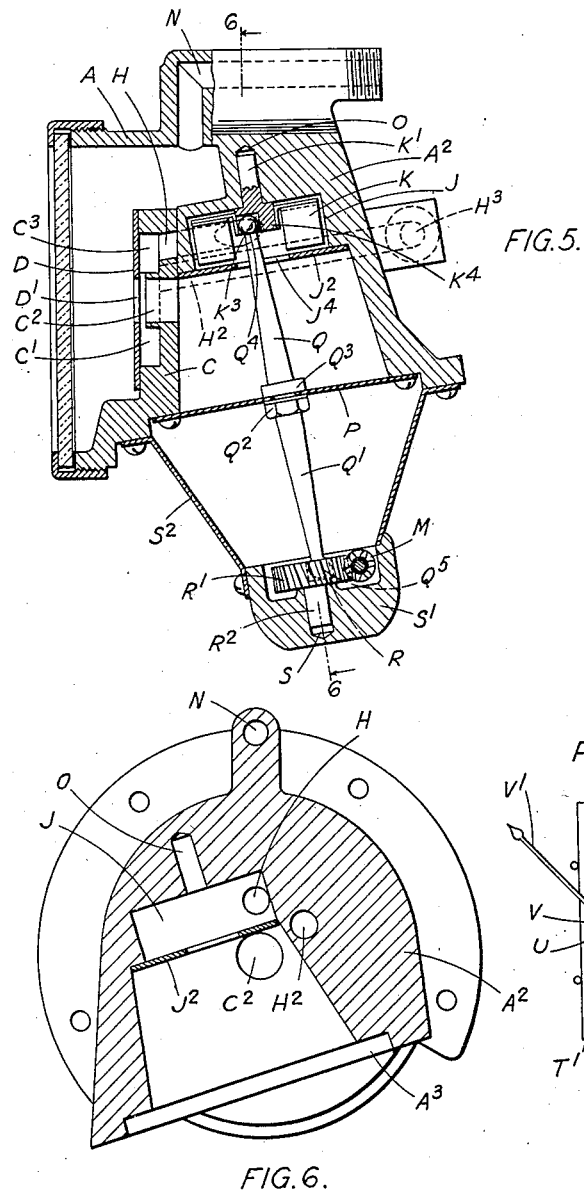

Patented Feb. 18, 1930

1,747,536

UNITED STATES PATENT OFFICE

ROBERT AERNOUT, BARON VAN LYNDEN, OF LONDON, ENGLAND

FLUID-CURRENT METER

Application filed January 21, 1927, Serial No. 162,644, and in Great Britain February 9, 1926.

This invention relates to fluid current meters of the type comprising an indicating member which is subjected to and moved by the forces due to the action of two fluid streams. The object of the invention is to provide a simple construction of this type which will be sensitive and available for various purposes whether the fluid currents are of a gaseous or liquid nature.

According to this invention the improved fluid current meter comprises a member movable within a casing and dividing this casing into two parts whose volumetric capacities are variable by the movements of the member. There is a passage in communication with one part of this casing through which passage fluid is caused to flow at a determined rate while there is a second passage in communication with the other part of the casing through which passage fluid can flow at an undetermined rate, the pressures due to the flow of the fluids in these two passages acting on the movable member and causing it to assume positions in the casing corresponding to the differences between these pressures. Thus for example by suitable means fluid is caused to flow at a determined rate into one part of the casing and act on one side of the movable member mounted within this casing so that this fluid will tend to move this member in one direction. Fluid which is flowing at an undetermined rate is permitted to enter the second part of the casing and act on the other side of the movable member therein so as to tend to move this member in the opposite direction. There is an outflow opening so controlled by the movable member that the area available for the outflow of the fluid from each part of the casing respectively is varied by the movement of the member and in accordance with the position which this member is caused to take up by the action thereon of the fluid in the two parts of the casing.

In one form the improved construction comprises a casing provided with two inlet openings and a single outlet opening the movable member being so mounted within the casing that part of it lies in the outlet opening while another part which can oscillate between the two inlet openings is constructed so as to divide the casing into two parts whose volumetric capacities will be varied by the movements of the member. In some convenient manner a fluid is caused to flow at a determined rate into the casing through one of the inlet openings and thereby establish a pressure on one side of the movable member which will tend to move this member in one direction. A second stream of fluid is caused to enter the casing at an undetermined rate through the second inlet opening so as to establish a pressure on the other side of the movable member which will tend to move this member in the opposite direction. The outflow opening is so controlled by the movable member that the area available for the outflow of the fluid from each part of the casing respectively is varied by the movement of the member and in accordance with the position which this member is caused to take up, by suitable means an indication of the rate of flow of the second fluid stream being given by or ascertainable from the positioning of the movable member.

The meter is particularly adapted for use on a moving body for example a motor road vehicle the meter being then employed for the purpose of measuring the consumption of the fuel in the internal combustion engine by which the vehicle is driven. In this case the one fuel stream is caused to flow at a determined rate which has a definite relation to the theoretically correct fuel consumption, while the second fuel stream which is at an undetermined rate is in accordance with the actual fuel consumption. Movements of the movable member are indicated in some convenient manner and show to what extent the fuel consumption varies from or whether it is in agreement with the theoretically correct fuel consumption.

In its simplest construction, the device may comprise a glass or other transparent tube disposed horizontally and having formed therein for a certain length a narrow longitudinal slot. In the tube is disposed a ball of suitable construction whose diameter is substantially the same as the internal diameter of the tube, the ball, however, being just free to roll in the tube. By suitable means the two fluid streams are led into the opposite ends of the tube so that they will act on opposite sides of the ball the fluid issuing through the longitudinal slot on either side of the ball. In accordance with the relation between the strengths of the forces due to the two fluid streams acting on the ball, the latter will take up a position in the tube which can be seen through the wall of the tube and thus the desired indication can be given, a scale if desired being disposed adjacent to the tube.

It is to be understood that the constructions may be modified in various ways as found desirable in accordance with the purpose for which the meter is to be used and these purposes may vary as also the nature of the fluid, whether liquid or gaseous, with which the current meter is employed.

The accompanying drawings illustrate by way of example four alternative arrangements according to this invention. The current meter here shown in Figures 1 to 6 is designed primarily for measuring the petrol consumption of an internal combustion engine on a motor road vehicle, the indication given by the meter being preferably in miles per gallon. In these drawings:—

Figure 5 is a vertical sectional elevation through a modified construction of the apparatus in which an alternative method is employed for driving the turbine by means of which the one fluid stream is induced. In this view certain parts of the mechanism are omitted since these are substantially the same as shown in Figure 1.

Figure 6 is a transverse section on the line 6—6 in Figure 5 looking in the direction of the arrows, the moving parts of the mechanism being omitted.

Figure 8:
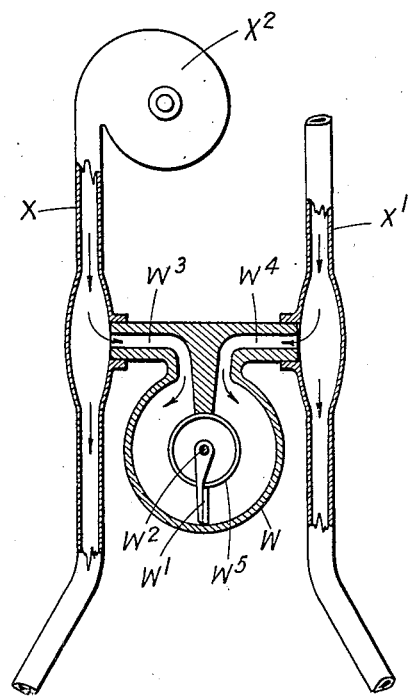

Figure 7 is a sectional elevation somewhat diagrammatic of yet another arrangement in which the movable member is adapted to move in a straight line in place of swinging about a centre, and Figure 8 is a sectional elevation showing a still further alternative arrangement in which the movable member is acted upon by fluid currents flowing through branch passages and communicating with the two main fluid streams.

Like letters indicate like parts throughout the drawings.

Figure 1:
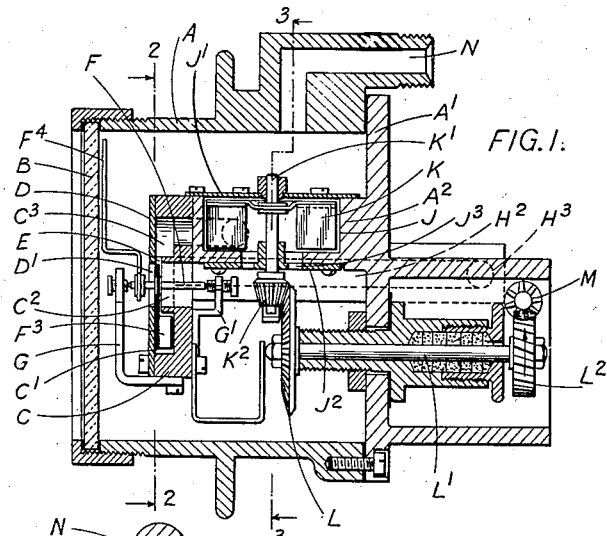
Figure 1 is a vertical sectional elevation through the casing and mechanism of the meter contained therein.
Figure 3:
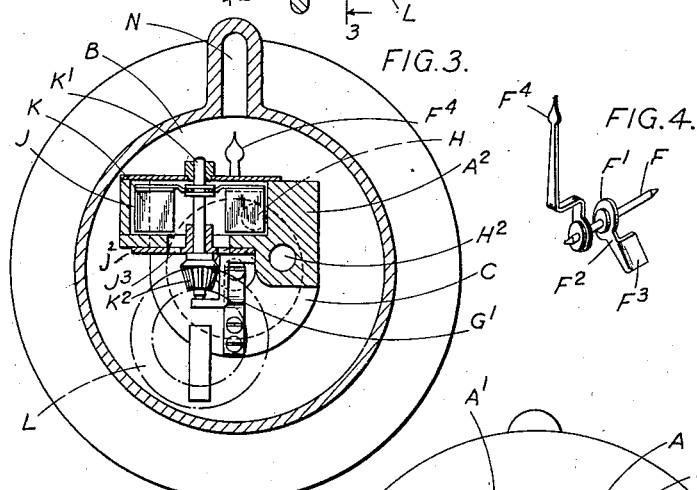
Figure 3 is a transverse section on the line 3—3 in Figure 1 looking in the direction of the arrows.
Figure 4:
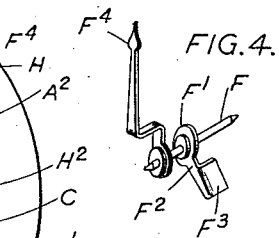
Figure 4 is a perspective view of the movable indicating member and its spindle as employed in the construction shown in Figures 1, 2 and 3.
Figure 2:
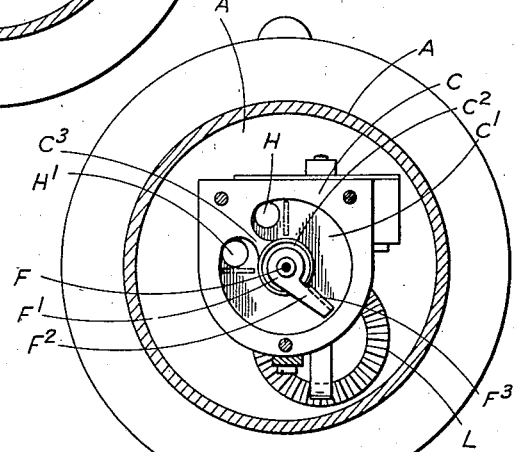
Figure 2 is a transverse section on the line 2—2 in Figure 1 looking in the direction of the arrows.

Referring to the constructions shown in Figures 1, 2 and 3, the mechanism is arranged within a casing A of suitable type and construction which is formed so as to obviate risk of leakage since the casing is intended to be wholly filled with the liquid fuel to be measured, for example, petrol. The main portion of the casing A is conveniently cylindrical one end being closed in by a glass or other transparent plate B through which the indications given by the mechanism can be read. A plate $A^1$ which closes in the back part of the casing A is provided with a bracket piece or block $A^2$ either formed integral with or mounted on the plate $A^1$ this bracket piece serving to carry the mechanism disposed within the casing. Attached to this bracket piece $A^2$ and in a suitable position with relation to the window B is fixed a metal piece or block C of convenient external shape having formed therein an annular recess $C^1$ and a central opening $C^2$ extending through the piece C. The recess $C^1$ is closed in by a plate D having in it a central hole $D^1$ which coincides with the hole $C^2$ in the block C. An annular slot E between the inner edge of the plate D and the inner part of the block C constitutes a communication between the recess $C^1$ and the opening $C^2$.

Disposed centrally within the holes $C^2$, $D^1$ is a spindle F the ends of which are carried in suitably arranged bearing screws mounted in bracket arms G and $G^1$ which are conveniently mounted on the block C. On this spindle F is fixed a disc $F^1$ having an arm $F^2$ which extends through the annular slot E into the recess $C^1$ and carries a vane $F^3$ the shape and dimensions of which are such as to be a loose fit within the recess $C^1$. In the construction shown the recess $C^1$ is rectangular in cross section and the vane $F^3$ is correspondingly shaped being formed conveniently by bending at right angles to the plane of the arm $F^2$ and disc $F^1$ a part of the metal of which these members are constructed. On the spindle F there is fixed also near one end a hand $F^4$ which lies adjacent to the glass plate B and in conjunction with a suitable scale serves to give the desired indication which results from the position occupied by the vane $F^3$ in the recess $C^1$.

At one point in the annular recess $C^1$ is a fixed partition $C^3$ which is conveniently formed integral with the block C. On either side of this partition and through the back wall of the recess $C^1$ are formed two holes H and $H^1$. The recess $C^1$ thus constitutes a chamber with two inlets H $H^1$ which lie adjacent but between which there is no direct communication owing to the presence of the partition $C^3$, the outlet from the recess being the annular slot E. The vane $F^3$ can move or swing freely in this chamber through an arc of approximately 270 degrees, the extreme positions of the vane $F^3$ being indicated in dotted lines in Figure 2. The vane is acted on by liquid streams entering through the holes H and $H^1$ and flowing out through the annular slot E and the position assumed by the vane will be determined by the difference between the forces applied thereto by these liquid streams and a corresponding indication will be given by the hand $F^4$.

The hole $H^1$ registers with a hole $H^2$ formed in the bracket block $A^2$ and extending to an inlet opening $H^3$ with which the fuel supply pipe can be connected at the back of the apparatus. The hole H leads into a chamber J formed in the upper part of the bracket block $A^2$. In this chamber J rotates a turbine or like device comprising blades K of suitable type and construction mounted on a central spindle $K^1$ rotatably carried by plates $J^1$ $J^2$ disposed above and below the chamber J. In the plate $J^2$ are holes $J^3$ around the spindle $K^1$. On the lower end of this spindle $K^1$ which extends beyond the outer face of the plate $J^2$ is a bevel pinion $K^2$ meshing with a bevel wheel L carried on a spindle $L^1$ which is rotatably mounted in a suitable bearing and extends through the back plate $A^1$ of the casing of the instrument. The bearing of this spindle $L^1$ is suitably packed so as to obviate risk of leakage of liquid fuel out from the casing along the spindle. On the outer end of the spindle $L^1$ is mounted a worm wheel $L^2$ with which engages a worm M suitably driven from the road wheels of the vehicle as for example by some flexible drive device after the manner of a speedometer. Thus the turbine K will be rotated as and when the vehicle moves and at a speed which will be determined by the speed of the vehicle.

The casing A is completely filled with a liquid fuel which can flow out to the engine through an outlet N to which can be connected a pipe leading to the carburetor.

The manner in which the device operates is as follows. As the vehicle moves along the road the turbine K will be rotated and as a result a stream of liquid fuel will be delivered by the turbine through the hole H into the chamber $C^1$ this stream acting on one side of the vane $F^3$ and flowing out of the chamber $C^1$ through the slot E, the inflow into the turbine chamber J taking place conveniently through the holes $J^3$ in the plate $J^2$. The rate of flow of this fluid stream is determined when the instrument is set initially, being in accordance with the theoretically correct fuel consumption of the engine of the vehicle. The actual fuel consumption of the engine will cause fuel to enter through the orifice $H^3$ and flow through the hole $H^1$ into the chamber $C^1$ in a stream whose rate of flow will be in accordance with this fuel consumption, that is to say, in accordance with the rate at which the fuel flows from the casing A through the outflow N. The fluid stream issuing from the hole $H^1$ will flow out from the chamber $C^1$ through the annular slot E and this stream will act on the vane $F^3$ but in opposition to the stream entering the chamber $C^1$ from the hole H. If the rate of flow of these two fluid streams into the chamber $C^1$ is equal, then the vane $F^3$ will take up a position equidistant from the holes H and $H^1$ in which position the vane is shown in Figure 2 and the hand $F^4$ will indicate the actual fuel consumption in miles per gallon, which will then be the theoretically correct fuel consumption for the vehicle. The fluid stream through the hole H due to the action of the turbine K will be constantly proportional to the speed of the vehicle but the fluid stream issuing through the hole $H^1$ will vary in accordance with the actual engine consumption. If the rate of flow of the fluid stream issuing through the hole $H^1$ is greater or less than the rate of flow of the fluid stream issuing through the hole H the vane $F^3$ will be caused to swing or move in the chamber $C^1$ and as a result the indicating arm $F^4$ will move and will show a fuel consumption in miles per gallon, which is either better or worse as the case may be than the theoretically correct fuel consumption.

It will be noted that since the outflow from the chamber $C^1$ is, as mentioned, through the annular slot E, and since apart from the partition $C^3$ this slot is unobstructed except where the vane-carrying arm $F^2$ passes through it, it will be apparent that the areas of the outlet portions of this slot available respectively for the liquid streams entering through the holes H and $H^1$ will vary in accordance with the position that the vane $F^3$ is caused to take up by the action thereon of these fluid streams.

The structure and mounting of the vane $F^3$ and indicating hand $F^4$ may be such that the spindle F and the parts carried thereby can be in static balance so that the spindle F can rotate freely and substantially without resistance in either direction under the influence of the fluid streams acting on the vane $F^3$. Since the function of the turbine K is merely to circulate the liquid and induce the flow through the hole H into the chamber $C^1$ and as the whole casing A is, as mentioned, filled with the liquid fuel, the work that has to be done by the turbine is very small and the parts may be suitably constructed accordingly.

Referring to the modified construction illustrated in Figures 5 and 6, in this the driving of the turbine K is effected in a manner designed to obviate risk of leakage of the fuel along a moving spindle such as the spindle $L^1$ which passes through the wall of the casing A $A^1$. The spindle $K^1$ of the turbine lies and can rotate in a hole O formed in a part of the block or projection $A^2$ which lies within the casing A. The recess J within which lies the turbine K is formed in the block $A^2$ and below the hole O which forms the bearing for the spindle $K^1$. The recess J is closed in on its under side by a plate $J^2$ in which is a central hole $J^4$. In place of there being an opening in the back of the casing A closed in by a plate $A^1$, as shown in the construction shown in Figure 1, there is an opening $A^3$ in the under side of the casing which is closed by a flexible diaphragm P this diaphragm being suitably secured in place so that leakage around its edge is prevented. A rod $Q\ Q^1$ passes through the centre of the diaphragm P and is securely fixed thereto by a nut $Q^2$ and a washer which can be screwed up on the the rod on one side of the diaphragm P against a collar $Q^3$ formed on the rod and lying on the opposite side of the diaphragm, the arrangement being such as to prevent leakage along the rod past the diaphragm. The end of the inner part Q of the rod is formed as a ball $Q^4$ which lies in a recess $K^3$ formed eccentrically in a block $K^4$ mounted on the turbine spindle $K^1$ this block $K^4$ carrying the turbine blades K. The end of the outer part $Q^1$ of the rod is provided with a similar ball $Q^5$ which lies in an eccentrically disposed recess R formed in a worm wheel $R^1$ which is mounted on a short spindle $R^2$. This spindle lies in a hole S constituting the bearing therefor and formed in a block $S^1$ which is in turn carried by a conical casing $S^2$ fixed to the under side of the casing A around the diaphragm P. The worm wheel $R^1$ is driven by a worm M from some convenient source as for example by means of mechanism similar to that employed for driving the speedometer on a motor road vehicle. The arrangement is such that as the worm wheel $R^1$ rotates rotation will be imparted through the rod $Q\ Q^1$ to the turbine K the flexibility of the diaphragm P permitting the rod $Q\ Q^1$ to oscillate about the centre of the diaphragm where the rod is fixed.

A passage H leads from the turbine recess J into the annular recess $C^1$ as in the construction shown in Figure 1, while a hole $H^2$ is formed in the same way in the block $A^2$ this hole communicating at one end with the hole $H^1$ which leads into the recess $C^1$ and at the other end with the inlet $H^3$.

The construction illustrated in Figure 7 shows an arrangement in which the movable member travels in a straight line in place of swinging about an arc.

In this case a straight tube $C^7$ is provided having formed in one side thereof and for a convenient length a straight longitudinally extending slot $E^1$. In the tube $C^7$ lies a disc $F^9$ constituting a vane which is carried by a projection $F^{10}$ from a toothed rack T which is suitably guided so that it can slide parallel to the tube $C^7$ as the vane $F^9$ is caused to move in one direction or the other within this tube. A second and similar toothed rack $T^1$ is disposed opposite to the rack T being mounted so that it can slide parallel to the rack T. Meshing with these two racks is a toothed pinion U mounted on a spindle V which carries an indicating hand $V^1$. As the vane $F^9$ moves in one direction or the other the spindle V will be caused to turn and the hand $V^1$ to give an indication. The rack $T^1$ will serve to balance the rack T and the vane $F^9$ carried thereby.

The vane $F^9$ which is conveniently a fairly close but yet an easy fit within the tube $C^7$ divides the interior of the latter into two chambers $C^8$ and $C^9$. The two fluid streams are caused to enter these chambers $C^8$ and $C^9$ and can flow out from the tube $C^7$ by the slot $E^1$ the area of the outflow which is thus available for either fluid stream being varied in accordance with the position occupied by the vane $F^9$ as a result of the difference between the forces acting thereon and due to the two fluid streams.

In some cases each main fluid stream may pass through a passage which communicates by a branch passage with the chamber in which lies the vane or other movable member on which can act the pressures due to the fluid streams. One example of such an arrangement is illustrated diagrammatically in Figure 8. This construction comprises a chamber W having a vane $W^1$ therein pivoted at $W^2$ and adapted to be acted upon by the pressures due to fluid streams entering by two inlet passages $W^3$, $W^4$, and adapted to escape through a common outlet slot or opening $W^5$ corresponding to the outlet opening E in the construction shown in Figure 1. The construction shown in Figure 8 as so far described is arranged and operated in substantially the same manner as the construction shown in Figure 1. The inlet passages $W^3$, $W^4$, instead of constituting openings through which the whole of the two fluid streams the relative pressure of which are to be indicated, pass, constitute merely bypass or branch passages communicating respectively with pipes X, $X^1$ through which the main fluid streams flow. Thus in the example shown, fluid flow is caused to take place in the pipe X by means of a centrifugal pump $X^2$ which is driven for example at a determined rate dependent upon the speed of the vehicle where the device is used, for example for measuring petrol consumption in miles per gallon. The flow of fluid which it is desired to measure in comparison with that through the pipe X takes place through the pipe $X^1$. By making the pipes X, $X^1$ of suitable dimensions and, if desired, providing them with portions of increased diameter where they communicate with the passages $W^3$, $W^4$, as shown, the pressures acting on the vane W¹ through the passages W³, W⁴ can be caused to have some definite relation to the rates of flow in the two pipes X, X¹, so that the vane is caused to move in accordance with variations in such rates of flow relatvely to one another.

What I claim as my invention and desire to secure by Letters Patent is:—

1. In a fluid current meter the combination of a casing forming a chamber, a member freely movable within this chamber and dividing it into two parts whose volumetric capacities are variable by movement of the member, means whereby fluid is caused to flow through a passage communicating with the one part of the chamber, means whereby fluid is caused to flow through a second passage communicating with the other part of the chamber, a single passage constituting an outflow for all the fluid entering the chamber, and means for indicating the movements of the member caused by the difference between the fluid pressures acting on the member in the chamber.

2. In a fluid current meter the combination of a casing forming a chamber, a member freely movable within the chamber and dividing it into two parts whose volumetric capacities are variable by movement of the member, means whereby fluid is caused to flow through a passage communicating with the one part of the chamber, means whereby fluid is caused to flow through a second passage communicating with the other part of the chamber, a single passage constituting an outflow for all the fluid entering the chamber, means actuated by the movable member and movable therewith for controlling the flow of fluid from each part of the chamber into the outflow passage, and means for indicating the movements of the member caused by the difference between the fluid pressures acting on the member in the chamber.

3. In a fluid current meter the combination of a casing forming a chamber, a member freely movable within the chamber and dividing it into two parts whose volumetric capacities are variable by movement of the member, means whereby fluid is caused to flow at a determined rate through a passage communicating with the one part of the chamber, means whereby fluid is caused to flow at an undetermined rate through a second passage in communication with the other part of the chamber, a single passage constituting an outflow for all the fluid entering the chamber, and means for indicating the movements of the member caused by the difference between the fluid pressures acting on the member in the chamber.

4. In a fluid current meter the combination of a casing forming a chamber, a member freely movable within the chamber and dividing it into two parts whose volumetric capacities are variable by movement of the member, means whereby fluid is caused to flow at a determined rate through a passage communicating with the one part of the chamber, means whereby fluid is caused to flow at an undetermined rate through a second passage in communication with the other part of the chamber, a single passage constituting an outflow for all the fluid entering the chamber, means actuated by the movable member and movable therewith for controlling the flow of fluid from each part of the chamber into the outflow passage, and means for indicating the movements of the member caused by the difference between the fluid pressures acting on the member in the chamber.

5. In a fluid current meter the combination of a casing in which is an annular chamber, a partition extending radially into this annular chamber, a member freely movable within the chamber and serving with the partition to divide the chamber into two parts whose volumetric capacities are variable by movement of the member, means whereby fluid is caused to flow through a passage opening into the chamber adjacent to and at one side of the partition, means whereby fluid is caused to flow through a second passage opening into the chamber adjacent to and on the other side of the said partition, a single passage leading from the centre of the annular chamber and constituting an outflow for all the fluid entering the chamber, and means for indicating the movements of the member caused by the difference between the fluid pressures acting on the member in the chamber.

6. In a fluid current meter the combination of a casing forming a chamber, a member freely movable within this chamber and dividing it into two parts whose volumetric capacities are variable by movement of the member, means comprising an impeller whereby fluid is caused to flow through a passage communicating with the one part of the chamber, means whereby fluid is caused to flow through a second passage communicating with the other part of the chamber, a single passage constituting an outflow for all the fluid entering the chamber, and means for indicating the movements of the member caused by the difference between the fluid pressures acting on the member in the chamber.

7. In a fluid current meter the combination of a casing forming a chamber, a member freely movable within this chamber and dividing it into two parts whose volumetric capacities are variable by movement of the member, means comprising an impeller whereby fluid is caused to flow at a variable but determinable rate through a passage communicating with the one part of the chamber, means whereby fluid is caused to flow at a variable rate through a second passage in communication with the other part of the chamber, a single passage constituting an outflow for all the fluid entering the chamber, means actuated by the movable member and movable therewith for controlling the flow of fluid from each part of the chamber into the outflow passage, and means for indicating the movements of the member caused by the difference between the fluid pressures acting on the member in the chamber.

8. In a fluid current meter the combination of a casing forming a chamber, a member freely movable within this chamber and dividing it into two parts whose volumetric capacities are variable by movement of the member, means whereby fluid is caused to flow through a passage communicating with the one part of the chamber, means whereby fluid is caused to flow through a second passage communicating with the other part of the chamber, a single passage constituting an outflow for all the fluid entering the chamber, means for indicating the movements of the member caused by the difference between the fluid pressures acting on the member in the chamber, and an outer casing enclosing the said chamber and filled with fluid, all the fluid flowing from that chamber passing into this outer casing whence it can escape through an outflow orifice.

9. In a fluid current meter the combination of a casing forming a chamber, a member freely movable within the chamber and dividing it into two parts whose volumetric capacities are variable by movement of the member, an outer casing enclosing the said chamber and filled with fluid, means comprising an impeller whereby fluid drawn from within the outer casing is caused to flow at a variable but determinable rate through a passage communicating with the one part of the said chamber, means whereby fluid is caused to flow from without the outer casing through a second passage communicating with the other part of the said chamber, a single passage constituting an outflow from the chamber through which outflow all the fluid entering the chamber can escape into the outer casing, means for indicating the movements of the member caused by the difference between the fluid pressures acting on the member in the said chamber, and a passage through which the fluid can flow from the outer casing.

10. In a fluid current meter the combination of a casing in which is an annular chamber, a partition extending radially into this annular chamber, a member freely movable within the chamber and serving with the partition to divide the chamber into two parts whose volumetric capacities are variable by movement of the member, an outer casing enclosing the said annular chamber and filled with fluid, means comprising an impeller whereby fluid drawn from within the outer casing is caused to flow at a variable but determinable rate through a passage opening into the annular chamber adjacent to and at one side of the partition, means whereby fluid is caused to flow from without the outer casing through a second passage opening into the annular chamber adjacent to and on the other side of the said partition, a single passage leading from the centre of the annular chamber and constituting an outflow through which all the fluid entering the chamber can escape into the outer casing, means for indicating the movements of the member caused by the difference between the fluid pressures acting on the member in the said chamber, and a passage through which the fluid can flow from the outer casing.

11. In a fluid current meter the combination of a casing in which is an annular chamber, a partition extending radially into this annular chamber, a member freely movable within the chamber and serving with the partition to divide the chamber into two parts whose volumetric capacities are variable by movement of the member, means whereby fluid is caused to flow through a passage opening into the chamber adjacent to and at one side of the partition, means whereby fluid is caused to flow through a second passage opening into the chamber adjacent to and on the other side of the said partition, a single passage leading from the centre of the annular chamber and constituting an outflow for all the fluid entering the chamber, means actuated by the movable member and movable therewith for controlling the flow of fluid from the two parts of the annular chamber into the outflow passage, and means for indicating the movements of the member caused by the difference between the fluid pressures acting on the member in the chamber.

12. In a fluid current meter the combination of a casing in which is an annular chamber, a partition extending radially into this annular chamber, a rotatable spindle mounted centrally with respect to the annular chamber and carrying a vane which lies and is freely movable within the chamber and serves with the partition to divide this chamber into two parts whose volumetric capacities are variable by movement of the member, means whereby fluid is caused to flow through a passage opening into the chamber adjacent to and at one side of the partition, means whereby fluid is caused to flow through a second passage opening into the chamber adjacent to and on the other side of the said partition, a single passage leading from the centre of the annular chamber and constituting an outflow for all the fluid entering the chamber, the said vane-carrying spindle lying in this outflow passage, and a hand carried by the said spindle and serving in conjunction with a fixed scale to indicate the movements of the vane caused by the difference between the fluid pressures acting on the vane in the chamber.

13. In a fluid current meter the combination of a casing in which is an annular chamber, a partition extending radially into this annular chamber, a rotatable spindle mounted centrally with respect to the annular chamber and carrying an arm on which is mounted a vane the latter lying and freely movable within the annular chamber and serving with the partition to divide the chamber into two parts whose volumetric capacities are variable by movement of the member, means whereby fluid is caused to flow through a passage opening into the chamber adjacent to and at one side of the partition, means whereby fluid is caused to flow through a second passage opening into the chamber adjacent to and on the other side of the said partition, a single passage leading from the centre of the annular chamber and constituting an outflow for all the fluid entering the chamber, the said vane-carrying spindle lying centrally in this outflow passage and the flow of fluid from each part of the chamber into the outflow passage being controlled by the position and movement of the arm and the vane carried thereby, and a hand carried by the said spindle and serving in conjunction with a fixed scale to indicate the movements of the vane-carrying arm caused by the difference between the fluid pressures acting on the vane in the chamber.

14. In a fluid current meter the combination of a casing in which is an annular chamber, a partition extending radially into this annular chamber, a rotatable spindle mounted centrally with respect to the annular chamber and carrying an arm on which is mounted a vane the latter lying and freely movable within the annular chamber and serving with the partition to divide the chamber into two parts whose volumetric capacities are variable by the movement of the member, an outer casing enclosing the said annular chamber and filled with fluid, means comprising an impeller whereby fluid drawn from within the outer casing is caused to flow through a passage opening into the annular chamber adjacent to and at one side of the partition, means whereby fluid is caused to flow from without the outer casing through a second passage opening into the annular chamber adjacent to and on the other side of the said partition, a single passage leading from the centre of the annular chamber and constituting an outflow through which all the fluid entering the chamber can escape into the outer casing, the said vane-carrying spindle lying centrally in this outflow passage and the flow of fluid from each part of the chamber into the outflow passage being controlled by the position and movement of the arm and vane carried thereby, a hand carried by the said spindle and serving in conjunction with a fixed scale to indicate the movements of the vane-carrying arm caused by the difference between the fluid pressures acting on the vane in the chamber, and a passage through which the fluid can flow from the outer casing.

15. In a fluid current meter the combination of a casing forming an elongated chamber having in its wall a slot, a member freely movable within the chamber and dividing it into two parts whose volumetric capacities are variable by movement of the member, an arm extending from this member through the slot in the wall of the chamber, means whereby fluid is caused to flow through a passage opening into the one part of the chamber at one side of the movable member, means whereby fluid is caused to flow through a second passage opening into the other part of the chamber at the other side of the movable member, the slot constituting an outflow opening for all the fluid thus entering the chamber and being divided into two parts by the arm extending therethrough, and means actuated by the movable member through the arm which carries it for indicating the movements of the member in the chamber caused by the difference in the fluid pressures acting on the opposite sides of that member.

16. In a fluid current meter the combination of a casing forming an elongated chamber having in its wall a slot, a member freely movable within the chamber and dividing it into two parts whose volumetric capacities are variable by movement of the member, an arm extending from this member through the slot in the wall of the chamber, an outer casing enclosing the said chamber and filled with fluid, means whereby fluid is caused to circulate from within the outer casing into the chamber through a passage opening into one part of the chamber at one side of the movable member and thence through the slot in the wall of the chamber, means whereby fluid is caused to flow by way of a passage leading through the wall of the outer casing into the other part of the chamber at the other side of the movable member whence this fluid flows through the slot into the outer casing, the slot thus constituting a common outflow opening for all the fluid entering the chamber and being divided into two parts by the arm extending therethrough, an outflow passage through the wall of the outer casing through which the fluid contained therein can escape, and means actuated by the movable member through the arm which carries it for indicating the movement of the member in the chamber caused by the difference in the fluid pressures acting on the opposite sides of that member.

17. In a fluid current meter the combination of a casing in which is in an annular chamber formed around a centrally disposed passage with an annular slot constituting an opening leading from the chamber into this passage, a partition extending radially across this annular chamber, a rotatable spindle mounted centrally with respect to the annular chamber and lying in the central passage, an arm on this spindle extending through the annular slot into the chamber, a vane mounted on the end of the arm within the chamber and serving with the partition to divide the chamber into two parts whose volumetric capacities are variable by movement of the vane, means whereby fluid is caused to flow through a passage opening into the chamber adjacent to and at one side of the partition, means whereby fluid is caused to flow through a second passage opening into the chamber adjacent to and on the other side of the said partition, all the fluid entering the two parts of the chamber flowing out through the annular slot into the central passage and the flow of fluid from each part of the chamber into this outflow passage being controlled by the position of the vane-carrying arm, and a hand carried by the said spindle and serving in conjunction with a fixed scale to indicate the movements of the vane-carrying arm caused by the difference between the fluid pressures acting on the vane in the chamber.

18. In a fluid current meter the combination of a casing in which is an annular chamber formed around a centrally disposed passage with an annular slot constituting an opening leading from the chamber into this passage, a partition extending radially across this annular chamber, a rotatable spindle mounted centrally with respect to the annular chamber and lying in the central passage, an arm on this spindle extending through the annular slot into the chamber, a vane mounted on the end of the arm within the chamber and serving with the partition to divide the chamber into two parts whose volumetric capacities are variable by movement of the vane, an outer casing enclosing the said chamber and filled with fluid, means whereby fluid is caused to circulate from within the outer casing into the chamber through a passage opening into the chamber at a point adjacent to and at one side of the partition, the fluid flowing thence through the slot in the wall of the chamber back into the outer casing, means whereby fluid is caused to flow by way of a passage leading through the wall of the outer casing into the chamber at a point adjacent to the other side of the said partition whence this fluid flows through the slot opening into the outer casing, the slot thus constituting a common outflow opening for all the fluid entering the chamber and being divided into two parts by the arm extending therethrough, an outflow passage through the wall of the outer casing through which the fluid contained therein can escape, and a hand carried by the said spindle and serving in conjunction with a fixed scale to indicate the movements of the vane-carrying arm caused by the difference between the fluid pressures acting on the vane in the chamber.

19. A fluid current meter, including in combination, a conduit through which fluid flows at an undetermined rate, a second conduit through which fluid flows at a determined rate, a common chamber interconnecting said conduits, a common outlet from said chamber for both of said conduits, and a member freely movable in said chamber in response to variations of fluid pressure in each of said conduits, and which by its position determines the effective outlet areas available for the flow of fluid from said conduits, the resultant position of said member serving to give an indication of the relative rates of flow in the two conduits.

20. A fluid current meter comprising a conduit provided with inlets at its oposite ends, and with outlet means intermediate thereof, means for conducting fluid to said inlets, and a member movable within and longitudinally of said conduit by the action of said fluid for indicating the relative amounts of flow at the inlets.

21. A fluid current meter comprising a conduit provided with two inlets and an outlet means intermediate thereof, a member movable in the intermediate portion of said conduit, means for introducing fluid through said inlets, said conduit being so constructed as to cause the fluid from the inlets to impinge on said member from opposite directions, whereby the position of the member serves to indicate the relative flow through the inlets.

22. A fluid current meter comprising a chamber provided with outlet means extending longitudinally thereof, means for causing a fluid to flow in two oppositely directed streams within said chamber, a member movable longitudinally within said chamber, the action of the two streams causing said member to move to a position in which the fluid pressure on said member is substantially balanced for indicating the relative flow of the streams of fluid.

23. A fluid current meter comprising a conduit provided with outlet means extending longitudinally thereof, means for causing a fluid to flow into the conduit from opposite ends thereof, and a member movable within said conduit to a position in which the pressures of the fluid streams are substantially equal for indicating the relative fluid flow at the ends of the conduit.

24. A fluid current meter comprising a conduit provided with fluid inlets at opposite ends thereof, and being so constructed as to cause the pressure of fluid admitted to said inlets to progressively decrease during its passage through the conduit, and a member movable within and longitudinally of said conduit by the action of said fluid for indicating the relative amounts of flow at the inlets.

25. A fluid current meter comprising a conduit provided with inlets at its opposite ends and with outlet means intermediate thereof, means for conducting fluid to said inlets, a member movable within and longitudinally of said conduit by the action of said fluid, and means carried by said member for indicating the position thereof, whereby the relative rates of flow at the inlets may be determined.

26. A fluid current meter comprising a chamber provided with fluid inlets at opposite ends thereof, and being so constructed as to cause the pressure of fluid admitted to said inlets to progressively decrease during its passage through the chamber, means for conducting a stream of fluid having a determined rate of flow through one inlet, means for conducting a stream of fluid having an undetermined rate of flow through the other inlet, and a member movable within said chamber to a position in which the pressures from the two streams of fluid are substantially equal, the resultant position of said member serving to indicate the rate of flow of said second mentioned stream of fluid.

27. A fluid current meter comprising a chamber provided with inlets at each end and outlet means intermediate thereof, means for conducting fluid from said outlet means to one of said inlets at a determinable rate, means for conducting fluid to the other inlet, and a member movable within and longitudinally of said chamber by the action of the fluid for indicating the relation of fluid flow through said inlets.

28. A fluid current meter comprising a conduit provided with inlets at its opposite ends, and with outlet means intermediate thereof, means for conducting fluid to said inlets, and a member movable within and longitudinally of said conduit by the action of said fluid for indicating the relative amounts of flow at the inlets, said member serving to regulate the flow of fluid through said outlet means.

29. A fluid current meter comprising an annular chamber provided with inlets at each end and an intermediate longitudinally extending slot constituting an outlet, means for conducting fluid to said inlets, and a member movable within said chamber by the action of said fluid and having a portion thereof movable in said slot for regulating the discharge of fluid from the chamber.

30. A fluid current meter comprising an annular chamber provided with inlets at each end and an intermediate longitudinally extending slot constituting an outlet, means for conducting fluid to said inlets, and a member movable within said chamber by the action of said fluid and having a portion thereof movable in said slot for regulating the discharge of fluid from the chamber, and means movable with said member for indicating the position thereof.

31. In a fluid current meter, the combination with a fluid containing casing provided with an outlet of a conduit therein provided with an inlet at each end and an outlet intermediate thereof, said outlet discharging into said casing, means to introduce fluid through one inlet, means to conduct fluid from said casing through the other inlet, and a member movable within said conduit, said fluid acting on said member to cause the same to assume a position determined by the relative flow of fluid through said inlets.

32. In a fluid current meter, the combinaton with a fluid containing casing provided with an outlet, of a chamber therein provided with two inlets and outlet means, said outlet means opening into said casing, means for supplying fluid to one of said inlets, means for conducting fluid at a determinable rate from the casing to the other inlet, and a member movable within said chamber by the action of the fluid for indicating the relative flow through said inlets.

33. In a fluid current meter, the combination with a fluid containing casing provided with an outlet, of a chamber therein provided with two inlets and outlet means, said outlet means opening into said casing, means for supplying fluid to one of said inlets, means for conducting fluid at a determinable rate from the casing to the other inlet, and a member movable within said chamber by the action of the fluid for indicating the relative flow through said inlets, said member serving to regulate the discharge of fluid from said outlet means.

In testimony whereof I have signed my name to this specification.

ROBERT AERNOUT, BARON van LYNDEN.